Sept. 30, 1969 S. S. HARBAUGH 3,470,538
AUTOMATIC START CIRCUIT FOR COMPUTER
Filed Dec. 28, 1966
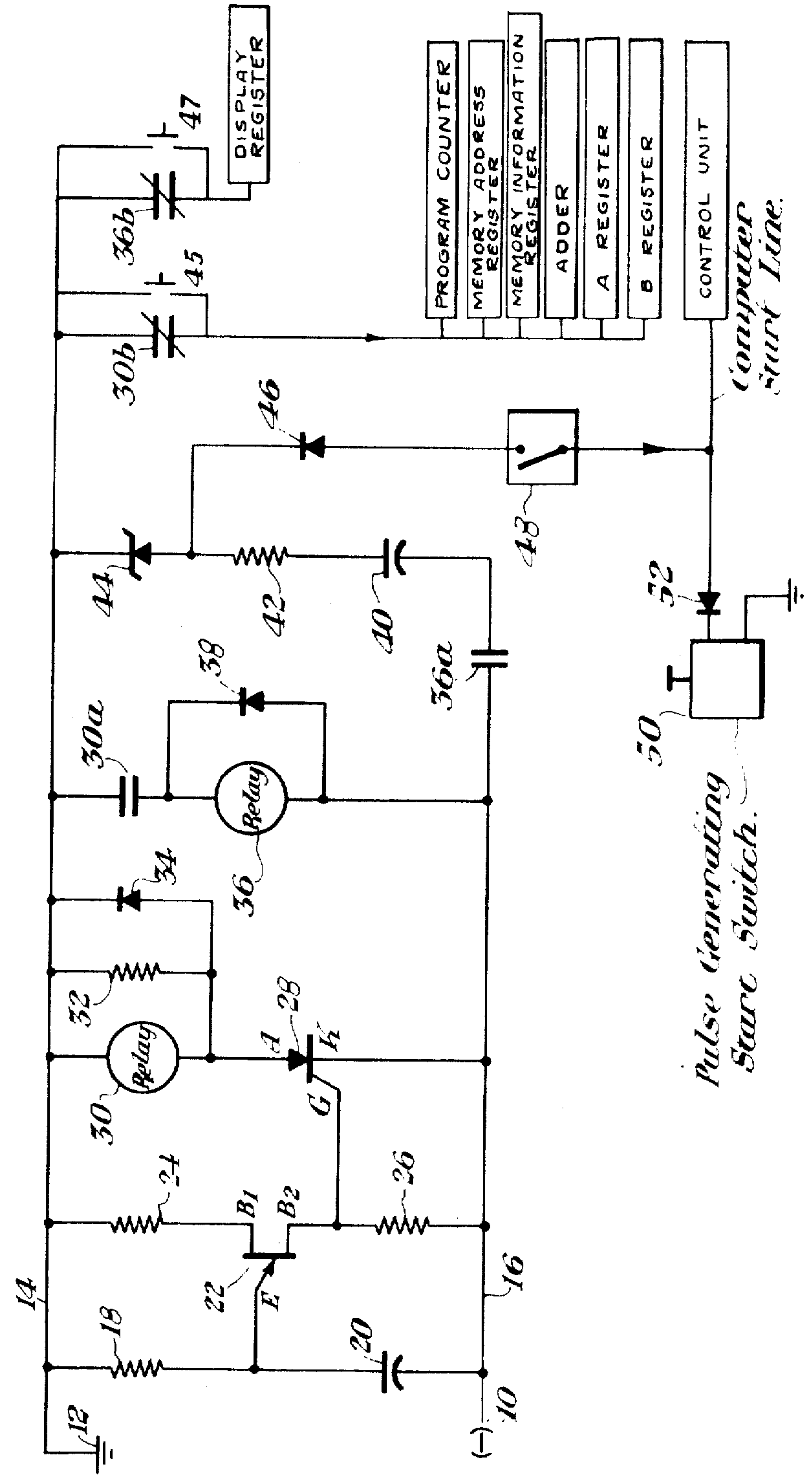

3,470,538

AUTOMATIC START CIRCUIT FOR COMPUTER

Samuel S. Harbaugh, Natrona Heights, Pa., assignor to Allegheny Ludlum Steel Corporation, Brackenridge, Pa., a corporation of Pennsylvania Filed Dec. 28, 1966, Ser. No. 605,391

Int. Cl. G11b *13/00;* H01h *47/32;* H03k *17/00*

U.S. Cl. 340—172.5 3 Claims

ABSTRACT OF THE DISCLOSURE

An apparatus for sequencing the circuitry of a computer to provide automatic operation upon the initiation of power to the computer whereby means responsive to the initiation of power immediately clears the display registers and the arithmetic registers and initiates the start of the time delay period necessary for the clearing operation, the end of the time delay period then energizes switching means for the removal of the clearing circuitry and establishes a second time delay period, the end of which initiates a start pulse to set the register to a first active memory location for the control program desired to be executed.

Background of the invention

With computer time at a premium, and computer operations being conducted often times in the absence of an operator, it is essential that this time be fully utilized. When the computer has stopped due either to power failure or simply being turned off, the computer information storage and programming sequence is not always in a predictable state, and consequently this necessitates an operator's clearing the garbled information and resetting the computer information storage to predetermined known values. It is therefore desirable that with the resumption or initiation of power, that automatic start operation be initiated to minimize computer down time. In a computer such as Minneapolis Honeywell Model DDP–116 there is provided an "on" switch to turn on the power, a "master clear" button to clear the various registers which direct information flow. In computers such as DDP–116, there is a Program Counter to direct retrieval of information, an Arithmetic register for manipulation of computer words and a Display register to transport information to various display units, and a "start" button for starting computing operation. In order to initiate the operation of the computer, it is necessary to depress the buttons in the proper sequence. In the computer in the example as with other less expensive models, certain of the core memory locations serve as indexing means for the program operation rather than repositories of information. Also, conventionally, a series of flip-flop circuits form the operational portion of registers, and particularly the Program Counter of the Minneapolis Honeywell DDP–116 (see Programmers Reference Manuel, Computer Control Co., Framingham, Mass.) Often, in the master clearing operation the Program Counter, or equivalent register, addresses a core memory location which serves as an indexing means. For automatic operation, this is an undesirable feature. To prevent indexing to such a memory location in the DDP–116 by the program counter, one or more of the individual flip-flops is reversed setting a different ground or "clear" memory core location to which the program counter to will index upon receiving the clearing signal. This procedure may also be described as setting the command register at an other than zero position upon grounding. With a solid state computer, the time sequence between buttons may not be too long; however, in older model computers having drum storage and electro-mechanical devices associated therewith, the time delay is greater for the clearing operations and, consequently, some of the buttons may be interlocked to prevent operation until a previous sequencing stage is completed.

It is accordingly an object of this invention to provide a new and improved computer automatic start circuit.

It is a further object of this invention to provide a new and improved computer automatic start circuit which is self-initiating upon the resumption of power.

It is a further object of this invention to provide a new and improved automatic start circuit which sequences the clearing of the registers and sets the register to a predetermined value other than zero.

Summary of the invention

The foregoing objects are accomplished by providing a circuit responsive to the initiation of power to first automatically initiate the computer circuitry for clearing arithmetic and display registers while simultaneously establishing the start of a first predetermined time delay period; secondly, actuating switch means at the end of said first predetermined time delay period, said switch means removing the register clearing operation; the actuation of said switch means initiating a second predetermined time delay period after which a start pulse is generated to start the computer in operation according to the instruction contained with the memory core indexed by the program sequencing register.

Brief description of the drawing

The foregoing and other objects will become apparent with a description of the circuit by reference to the drawing which is a schematic diagram of the computer automatic start circuit according to the invention.

DESCRIPTION OF THE PREFERRED EMBODIMENT

Circuit description

Referring now to the drawing, there is shown a DC voltage power supply having a negative terminal 10 and a positive or ground terminal 12, the power supply being dependent upon the same source of power for the computer. A lead 14 is connected to the ground terminal 12, and a lead 16 is connected to the negative power input terminal 10. Connected between the leads 14 and 16 is a series RC circuit including resistor 18 and and capacitor 20. A unijunction transistor 22 has its emitter terminal E connected to the point intermediate resistor 18 and capacitor 20. A base terminal $B_1$ of transistor 22 is connected through resistor 24 to lead 14, while base terminal $B_2$ of transistor 22 is connected through resistor 26 to lead 16. A silicon-controlled rectifier 28 has its anode terminal A connected in series with relay coil 30 to lead 14 with the cathode terminal K thereof being connected to lead 16. The gate terminal G of silicon-controlled rectifier 28 is coupled to base terminal $B_2$ of transistor 22. Connected in parallel with relay coil 30 is a resistor 32, and also connected in parallel with the relay coil 30 is a diode 34 having its cathode connected to lead 14. A second relay coil 36 has one end thereof connected to lead 16 and the other end connected through normally open relay contact **30*a* of relay 30 to lead 14. A diode 38 is connected in parallel with relay coil 36. A series circuit also exists between leads 14 and 16, being from 16 through normally open relay contact 36*a* through capacitor 40 through resistor 42 through Zener diode 44 to lead 14, with the cathode of the Zener diode 44 being connected to lead 14. Normally closed relay contacts 30*b* are connected between lead 14 and the appropriate circuitry in the computer for grounding the appropriate wires to provide the master clearing operation for the computer. By example, for the Minneapolis Honeywell DDP–116 computer, the contacts 30*b* would be connected in parallel with the manual master clearing button 45. Normally closed relay contacts 36***b* are tied to the ground lead 14 and connected to the appropriate computer circuitry to automatically perform the resetting of the display register which includes connecting the contacts 26*b* in parallel with the manual control 47. A diode 46 has its cathode electrically connected to the anode of the Zener diode 44 while the cathode of diode 46 is connected through switch 48 which can be mounted on the front panel for the purpose of disengaging the automatic start circuit if desired. Ordinarily, a pulse generating start switch 50 is in series with a diode 52 for the purpose of initiating a negative pulse for the starting of the computer operation. The switch 48 with the series diode 46 is so connected to by-pass the pulse generating start switch to permit the computer operation to be started from the automatic start circuit.

Circuit operation

When the power to the computer is initially interrupted, the computer is in halt and the registers are not in any predictable state. With the resumption of power, power appears between terminals 10 and 12, with terminal 10 being negative with respect to ground. The ground terminal designated 12 of necessity must be chassis grounded, or the same ground utilized in the computer circuit. The "master clear" and "display register clearing" buttons located on the computer console are manually operable buttons for the purpose of clearing the display lights on the panel and resetting the arithmetic registers. These buttons provide paths to ground, as does the start pushbutton located on the console. In the operation of this circuit, these functions are taken care of in a sequence and automatically. With the initiation of power between leads 14 and 16, the "master clear" circuitry and the "display P" circuitry are grounded through normally closed relay contacts 30*b* and 36*b*, it being understood that these paths would be in parallel with the manual switches 45 and 47 provided on the console. Simultaneously, capacitor 20 is charged through resistor 18, the duration of the charging time being dependent upon the values for the resistor 18 and capacitor 20. When capacitor 20 reaches a predetermined charge, the transistor 22 conducts, permitting the discharge of capacitor 20 from the emitter terminal E to the base terminal $B_2$ of transistor 22 through resistor 26 with a voltage appearing across resistor 26. As can be seen, the initiation of power establishes the beginning of a first time period, the duration of which is determined by the RC circuit. The voltage appearing across resistor 26 also appears at the gate terminal G of silicon-controlled rectifier 28, placing the silicon-controlled rectifier 28 in the conductive state. This then energizes relay coil 30 which is in series with the silicon-controlled rectifier 28. When relay coil 30 is activated, normally open relay contacts 30*a* close to energize relay coil 36, and normally closed relay contacts 30*b* open to remove the "master clear" command. The activation of relay coil 30 initiates the start of a second time delay period determined by the parameters of relays 30 and 36. Relay coil 36 is then energized through now closed relay contacts 30*a*, thereby opening normally closed relay contacts 36*b* to remove the "display register clearing" command and closing normally open contacts 36*a*. This completes a circuit from lead 16 through closed relay contacts 36*a* through capacitor 40 through resistor 42 through Zener diode 44 to lead 14. When relay contacts 36*a* close, a negative pulse is generated through switch 48, diode 46, resistor 42, capacitor 40, contacts 36*a* to negative lead 16, thereby initiating automatic start of the computer operation. As the charge on capacitor builds to the breakdown voltage of Zener diode 44 the diode will conduct thereby clamping the maximum voltage of the starting pulse to the breakdown voltage of the diode 44. A Zener diode having a breakdown voltage below the maximum allowable start pulse is chosen so that the starting pulse will not exceed allowable limits of the particular computer. This portion of the circuit thus duplicates the action of the "start switch" 50 in series with diode 52 providing automatic restarting of the computer after reapplication of power to the circuit following an interruption.

In the particular computer model mentioned, it is inadvisable to begin execution with "Program Counter" set to zero, since core location "0" is the index register, and a command cannot be stored there reliably. This is taken care of by changing the reset input to set input on certain of "Program Counter" register flip flops. Thus the "maser clear," upon grounding, sets the "Program Counter" register to a predetermined value other than 0. After the computer operation is initiated, capacitor 20 now acts as an open circuit but the transistor 22 is biased through resistor 18 to remain in its conductive state, thereby maintaining silicon-controlled rectifier 28 in its conductive state. Relays 30 and 36 remain energized. After the start circuit has pulsed to commence the computer operation and the pulse attenuates, the Zener diode 44 returns to its nonconductive state and the steady-state conditions prevent pulsing due to capacitor 40 in series with the Zener diode 44, now acting as an open circuit.

Diode 34 and resistor 32 in parallel with relay coil 30 are provided to permit dissipation of the inductive energy of the relay coil 30 in the event of another power interruption. Similarly diode 38 in parallel with relay coil 36 performs the same function.

It should also be noted that other computer models provide reliable storage in core location "0" so consequently in these computers the programming sequence can start at this point. Similarly some computers utilize motors and other electro-mechanical devices which can be accounted for in the present invention by modifying the time delay periods accordingly.

While there has been shown and described a specific embodiment, it is to be understood that various other modifications can be made within the spirit and scope of the invention to provide similar circuitry according to specific computers.

I claim:

1. In combination with a computer having registers to direct the manipulation of and storage of information to computer memory locations and circuit means for reorienting said registers, the improvement comprising an automatic start circuit to restart computer operations which have been halted by an interruption of electrical power, said automatic start circuit including:

(a) first circuit means responsive to the interruption of power to sequence the reorientation of said registers to address retrieval of information from a predetermined memory location including first relay means having normally closed contacts connected in parallel with the said circuit means for manually reorienting said registers and said first relay's energizing coil in parallel with the electrical power to the computer whereby interruption of electrical power to the computer will cause the manual means for reorienting said registers to be by-passed;

(b) second circuit means having time delay means responsive to the application of power to the computer for disenabling said circuit means for reorientation of said registers upon completion of reorientation of said registers including the energizing coil of said first relay means powered in response to time delay means for delaying actuation of said first relay means whereby said normally closed relay contacts will not open upon reapplication of power to the computer until the expiration of said time delay;

(c) third circuit means generating a computer starting pulse in response to said second circuit means disenabling of the register reorientation means including second relay means having normally open contacts in series with said pulse generating means for starting computer operations, and said second relay means having an energizing coil which receives energizing power in response to the actuation of said first relay means.

2. Apparatus according to claim 1 including as time delay means, a unijunction transistor having a primary base, a secondary base and an emitter, and a silicon controlled rectifier having an anode, a cathode and a gate, said bases being connected in parallel with a resistor and a capacitor connected in series and also in parallel with the energizing coil of said first relay means and the anode and cathode of said silicon controlled rectifier, said transistor and said rectifier oriented with said secondary base connected to said gate, and said emitter connected between said resistor and capacitor in series.

3. Apparatus according to claim 2 wherein the computer having a manual start line and timing and sequencing means are positive grounded and said pulse computer starting circuit includes a capacitor, a resistor and a Zener diode having an anode and a cathode in series, oriented with the Zener diode cathode connected to said positive ground, said computer manual starting line being connected to said computer starting pulse circuit between said resistor and said Zener diode anode through a diode having an anode and a cathode oriented with its anode on the side of said computer start line.

References Cited

UNITED STATES PATENTS

| | | | |
|---|---|---|---|
| 3,162,772 | 12/1964 | Smith. | |
| 3,286,135 | 11/1966 | Haver et al. | 317—142 |
| 3,303,396 | 2/1967 | Culbertson. | |
| 3,334,243 | 8/1967 | Cooper | 307—293 |
| 3,335,332 | 8/1967 | Zdzieborski | 317—142 |
| 3,349,293 | 10/1967 | Peffer | 317—142 |
| 3,377,471 | 4/1968 | Althaus et al. | 340—172.5 |
| 3,386,013 | 5/1968 | Hirsch | 317—142 |

ROBERT C. BAILEY, Primary Examiner

H. E. SPRINGBORN, Assistant Examiner

U.S. Cl. X.R.

307—252; 317—148.5